(No Model.)

H. E. WALTER.
DYNAMO ELECTRIC MACHINERY.

No. 373,034. Patented Nov. 8, 1887.

ATTEST:
E. Rowland
Wm. Pelzer

INVENTOR:
Henry E. Walter
By Dyer & Seely
Atty

UNITED STATES PATENT OFFICE.

HENRY E. WALTER, OF CLIFTON, ASSIGNOR TO HIMSELF AND CHARLES BATCHELOR, OF NEW YORK, N. Y.

DYNAMO-ELECTRIC MACHINERY.

SPECIFICATION forming part of Letters Patent No. 373,034, dated November 8, 1887.

Application filed January 6, 1887. Serial No. 223,585. (No model.)

*To all whom it may concern:*

Be it known that I, HENRY E. WALTER, a subject of the Queen of Great Britain, residing at Clifton, in the county of Richmond and State of New York, have invented a certain new and useful Improvement in Dynamo-Electric Machines, of which the following is a specification.

My invention relates to electro-dynamic motors and to converters or combined motors and generators, my object being to produce simple and efficient means for starting such machines from a distant point. In starting such machines it is desirable not to pass the whole current through the armature at the moment of closing circuit to the field-magnet and armature, because the rush of current before the field is brought up to full magnetization and the armature to full speed may overheat and destroy the armature-coils. Therefore, when the circuit is closed to the machine the armature-circuit should contain resistance, so that there is a weak current in the armature or a small difference of potential between the commutator-brushes, and the armature starts slowly, and this resistance is then gradually removed from the circuit, so that the difference of potential and the speed are brought up together gradually after the field-magnetization is attained.

In combined generators and motors used as converters for transforming a current of high tension on a supplying-line into one of low tension for use in translating devices, it is desirable to throw in the motor armature-coils or primary circuits through a gradually-removed resistance, as just described, and when the resistance is all removed and the full speed attained to close the circuit of the secondary or generator coils through the translating devices—that is, to place the load upon the machine.

By my invention I accomplish all the above operations, both for simple motors and for converters, automatically upon the closing of circuit to the machine.

My invention is illustrated in the accompanying drawings, in which—

Figure 1:
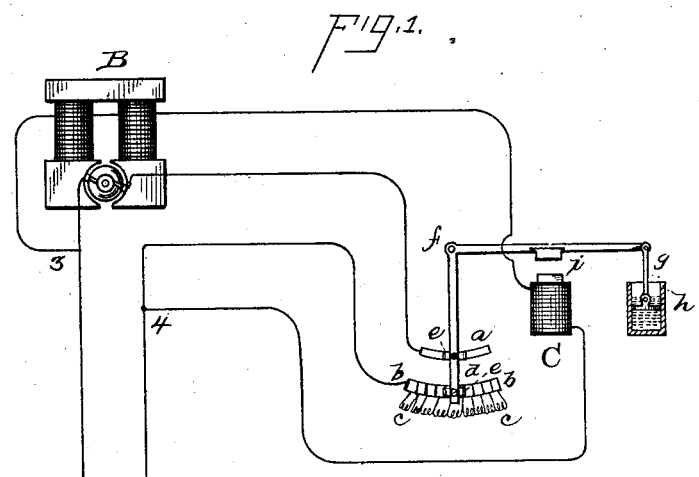
Figure 2:
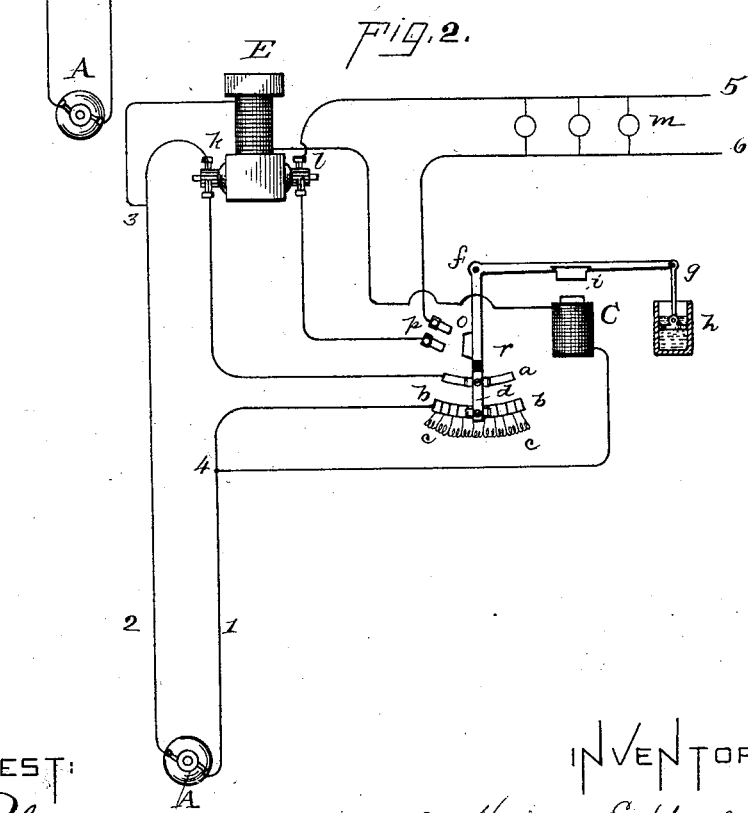

Figure 1 is a diagram illustrating my invention with a simple motor, and Fig. 2 a diagram illustrating its use with a converter.

Referring first to Fig. 1, A represents any suitable generator or source of electricity, from which a circuit, 1 2, extends to an electro-dynamic motor, B. The motor B has a normally-closed field-circuit, 3 4, shunted from the line 1 2, which circuit includes also the coils of an electro-magnet, C. One of the conductors of the circuit 1 2 is broken near the motor, and one terminal is connected with a metal contact-arc, $a$, while the other extends to the last of a series of contacts, $b\,b$, separated from one another by insulation and having resistance-coils $c\,c$ connected between them. The arc $a$ and resistance-contacts $b\,b$ are bridged by the metal arm $d$ sliding across them, and preferably provided with flat springs $e\,e$, which bear on the contacts.

Arm $d$ is pivoted at $f$, and from the pivot it extends at an angle and carries at its other end a plunger, $g$, working in a dash-pot, $h$, containing glycerine or other liquid. The pivoted arm has upon it an armature, $i$, attracted by the magnet C.

The operation of these devices is as follows: The arm $d$ is normally at the end of the series of resistance-contacts. On starting the generator A or closing the circuit 1 2 to the motor the field of the motor is energized, and so is the magnet C, and such magnet at once begins to draw down the arm $d$, so that the spring-contacts carried by said arm move gradually along the contact-arcs, the movement being retarded by the dash-pot, and the resistance-coils $c$, which at first were all in circuit, are gradually cut out, and the difference of potential between the commutator-brushes is raised and the speed is gradually increased to that required.

In Fig. 2, E is a double-wound rotating converter having two sets of coils on its armature and two commutators, $k$ and $l$, connected with said coils, respectively. In this figure the generator A is one producing a high-tension current, and the converter receives this current at commutator $k$ in its primary or motor coils and discharges a current of low tension at commutator $l$ from its secondary or generator coils. The shunted field-circuit includes, as in Fig. 1, the electro-magnet C, and the main conductor 1 includes the resistance $c$, adjustable in the manner already described.

From the commutator $l$ a circuit, 5 6, extends, including the electric lamps or other translating devices $m$ $m$ to be supplied with low-tension current, and one conductor of this circuit is broken at suitable contact-plates, $p$ $p$. These contact-plates are so situated relatively to the adjustable resistance and the arm $d$ that the contact blade or plate $o$, carried by said arm, bridges said plates as soon as the last coil is cut out and the full speed attained, and the circuit 5 6 is thereby closed. Thus the load is thrown upon the converter automatically as soon as the machine is brought up to speed. An insulating-section, $r$, may be interposed in arm $d$ between the blade $o$ and the part which bridges the resistance-contacts, or these parts may be insulated from each other in any other suitable way. This arrangement of contacts may also be used in connection with the simple motor B to close a circuit through an electro-magnet, which, by moving a friction-clutch or a belt-shifter, will throw the load upon the motor when its speed is attained.

In both forms of my invention the field-magnet is energized before the full current is put on the armature, its circuit being normally or constantly closed, so that the motor begins to run at once when circuit is closed to it.

It will be seen that the means employed in my invention and their operation are the same with simple motors and with converters, and these two classes of machines are therefore equivalent for the purposes of my invention; and I wish it to be understood that under the expression "electro-dynamic motor" in the claims I include both simple motors and rotating double-wound converters, and under the expression "armature-circuit" I mean either the simple armature-circuit of a motor or the primary or motor circuit of the double-wound rotating converter.

What I claim is—

1. The combination, with a shunt-wound electro-dynamic motor, of an adjustable resistance in the armature-circuit thereof inside of the terminals of the field-shunt, and a switch acting automatically upon the starting of the motor to gradually cut out said resistance, substantially as set forth.

2. The combination, with a shunt-wound electro-dynamic motor, of an adjustable resistance in the armature-circuit thereof inside of the terminals of the field-shunt, and an electrically-operated switch acting automatically upon the closing of circuit to the motor to gradually cut out said resistance, substantially as set forth.

3. The combination, with a shunt-wound electro-dynamic motor having its field-circuit normally closed, of an adjustable resistance in the armature-circuit thereof inside of the terminals of the field-shunt, and an electrically-operated switch operated by the current in said field-circuit so as to gradually cut out said resistance from the armature-circuit, substantially as set forth.

4. The combination, with a shunt-wound electro-dynamic motor and the supplying-circuit leading thereto, of an electro-magnet in a normally-closed branch from said supplying-circuit, an adjustable resistance in the armature-circuit and inside of the terminals of the field-shunt, of the motor affected by said electro-magnet and means for retarding the action of said magnet, whereby when circuit is closed to the motor said resistance is gradually cut out of the armature-circuit, substantially as set forth.

5. The combination, with a shunt-wound electro-dynamic motor having its field-circuit normally closed, of an electro-magnet in said field-circuit, an adjustable resistance in the separate armature-circuit and inside the terminals of the field-shunt affected by said magnet, and means for retarding the action of said magnet, whereby when circuit is closed to the motor said resistance is gradually cut out of the armature-circuit, substantially as set forth.

6. The combination, with an electro-dynamic motor and an adjustable resistance in the armature-circuit thereof, of a switch acting automatically upon the starting of the motor to gradually cut out said resistance and finally to close a circuit, whereby the load is placed upon the motor, substantially as set forth.

7. The combination, with an electro-dynamic motor and an adjustable resistance in the armature-circuit thereof, of an electrically-operated switch acting automatically upon the closing of circuit to the motor to gradually cut out said resistance and finally to close a circuit which places the load upon the motor, substantially as set forth.

8. The combination, with an electro-dynamic motor and the supplying-circuit leading thereto, of a normally-closed branch from said circuit including an electro-magnet, an adjustable resistance in the armature-circuit of said motor, a resistance-adjusting arm affected by said magnet, and a plunger connected with said arm and working in a dash-pot, substantially as set forth.

9. The combination, with a rotating double-wound converter, the supplying-circuit leading to the primary coils thereof, and an electro-magnet in a normally-closed branch from said circuit, of an adjustable resistance in the said primary circuit, a resistance-adjusting arm moved by said magnet and provided with means for retarding its movement, the secondary circuit leading from said converter and broken at contact-terminals, said arm being adapted to bridge said terminals when its movement across the resistance is completed, substantially as set forth.

This specification signed and witnessed this 29th day of December, 1886.

HENRY E. WALTER.

Witnesses:
WM. PELZER,
A. W. KIDDLE.